United States Patent
Shimoyama

(10) Patent No.: US 8,026,646 B2
(45) Date of Patent: Sep. 27, 2011

(54) MOTOR WITH URGING MEMBER COMPRISING A FLAT SPRING

(75) Inventor: Takeshi Shimoyama, Nagano (JP)

(73) Assignee: Nidec Sankyo Corporation (JP)

( * ) Notice: Subject to any disclaimer, the term of this patent is extended or adjusted under 35 U.S.C. 154(b) by 147 days.

(21) Appl. No.: 12/496,346

(22) Filed: Jul. 1, 2009

(65) Prior Publication Data

US 2010/0001600 A1 Jan. 7, 2010

(30) Foreign Application Priority Data

Jul. 1, 2008 (JP) ................................. 2008-172376

(51) Int. Cl.
H02K 5/00 (2006.01)
H02K 5/16 (2006.01)
H02K 37/00 (2006.01)

(52) U.S. Cl. ............... 310/89; 310/40 MM; 310/49.01; 310/90; 310/96; 310/51

(58) Field of Classification Search ............ 310/40 MM, 310/49.01, 51, 89, 90, 91, 96; H02K 5/00, H02K 5/16, 37/00
See application file for complete search history.

(56) References Cited

U.S. PATENT DOCUMENTS

| | | | | |
|---|---|---|---|---|
| 6,317,287 B1 * | 11/2001 | Yano et al. | ..................... | 360/260 |
| 6,910,564 B2 * | 6/2005 | Mochizuki | ................. | 192/84.92 |
| 7,420,303 B2 * | 9/2008 | Nishimura | ...................... | 310/90 |
| 2005/0285473 A1 * | 12/2005 | Kobayashi | ..................... | 310/261 |
| 2006/0179447 A1 * | 8/2006 | Yang et al. | ..................... | 720/676 |
| 2006/0202587 A1 * | 9/2006 | Agematsu | ..................... | 310/257 |
| 2006/0261684 A1 * | 11/2006 | Sonohara et al. | ........... | 310/49 R |
| 2006/0284496 A1 * | 12/2006 | Mizumaki | ..................... | 310/49 R |
| 2007/0164625 A1 * | 7/2007 | Kobayshi | ........................ | 310/90 |
| 2007/0216243 A1 * | 9/2007 | Agematsu | ....................... | 310/90 |
| 2010/0001600 A1 * | 1/2010 | Shimoyama | ..................... | 310/85 |

FOREIGN PATENT DOCUMENTS

| | | |
|---|---|---|
| JP | 6-98522 A | 4/1994 |
| JP | 2005-269733 A | 9/2005 |
| JP | 2007-104849 A | 4/2007 |

* cited by examiner

*Primary Examiner* — Quyen Leung
*Assistant Examiner* — John K Kim
(74) *Attorney, Agent, or Firm* — Cantor Colburn LLP

(57) ABSTRACT

A motor may include a rotor having a rotation shaft, a stator disposed on an outer peripheral side of the rotor, a frame fixed to the stator, and an urging member made of metal for urging an end part on an output side of the rotation shaft to an opposite-to-output side. The frame includes a bottom face part, a stator fixing part which is formed to be bent from the bottom face part and which is fixed to the stator, and a shaft support part which is formed to be bent from the bottom face part so as to face the stator fixing part and which supports the end part on the output side of the rotation shaft, and the urging member is fixed by welding to an output side face which is a face on an output side of the shaft support part. The urging member is preferably a flat spring.

12 Claims, 8 Drawing Sheets

MOTOR WITH URGING MEMBER COMPRISING A FLAT SPRING

CROSS REFERENCE TO RELATED APPLICATION

The present invention claims priority under 35 U.S.C. §119 to Japanese Application No. 2008-172376 filed Jul. 1, 2008, which is incorporated herein by reference.

FIELD OF THE INVENTION

An embodiment of the present invention may relate to a motor which is structured so that an end part on an output side of a rotation shaft is supported.

BACKGROUND OF THE INVENTION

As a motor for moving a lens and the like which is provided in an optical pickup device in a CD or a DVD player or which is provided in a camera, a stepping motor has been conventionally used which includes a lead screw that is formed on a tip end side of a rotation shaft protruded from its stator. This type of a stepping motor in which a tip end part of a rotation shaft is supported by a bearing and a flat spring has been known (see, for example, Japanese Patent Laid-Open No. 2007-104849, Japanese Patent Laid-Open No. 2005-269733, and Japanese Patent Laid-Open No. Hei 6-98522).

In the stepping motor described in the above-mentioned Patent References, a bearing held by a frame which is fixed to a stator supports a tip end part of a rotation shaft in a radial direction. Further, in this stepping motor, a flat spring (leaf spring) is abutted with a tip end of the rotation shaft to urge the rotation shaft in an opposite-to-output side so that the flat spring supports the tip end part of the rotation shaft in a thrust direction (axial direction). Further, the bearing is fixed to the frame by press-fitting. Further, in this stepping motor, an engagement part for engaging with the frame is formed in the flat spring and the flat spring is attached to the frame by utilizing elastic deformation of the engagement part.

In recent years, application of a stepping motor has been diversified. For example, a stepping motor is used in a portable apparatuses such as a small notebook-sized personal computer and a digital camera and thus a stepping motor which is superior in impact resistance is required. However, in the stepping motor described in the above-mentioned Patent References, since the flat spring is attached to the frame by utilizing elastic deformation of the engagement part formed in the flat spring, mounting position of the flat spring to the frame may be displaced by impact and, in the worst case, the flat spring may be disengaged from the frame.

SUMMARY OF THE INVENTION

In view of the problems described above, at least an embodiment of the present invention may advantageously provide a motor whose impact resistance is improved.

According to at least an embodiment of the present invention, there may be provided a motor including a rotor having a rotation shaft, a stator which is disposed on an outer peripheral side of the rotor, a frame which is fixed to the stator, and a metal urging member for urging an end part on an output side of the rotation shaft to an opposite-to-output side. The frame includes a bottom face part, a stator fixing part which is formed to be bent from the bottom face part and which is fixed to the stator, and a shaft support part which is formed to be bent from the bottom face part so as to face the stator fixing part and which supports the end part on the output side of the rotation shaft. The urging member is fixed by welding to an output side face which is a face on an output side of the shaft support part.

In a motor in accordance with an embodiment of the invention, the urging member is fixed by welding to the output side face of the shaft support part. Therefore, the urging member for urging the end part on the output side of the rotation shaft is firmly fixed to the frame. Therefore, displacement of the mounting position of the urging member to the frame and detachment of the urging member from the frame due to impact are prevented. As a result, impact resistance of the motor in accordance with the embodiment of the invention is improved. Further, since the end part on the output side of the rotation shaft is urged toward the opposite-to-output side, a non-movable bearing is used as the opposite-to-output side bearing which is attached to the end face on the opposite-to-output side of the stator and thus the bearing structure on the side of the stator is simplified. In this case, the opposite-to-output side bearing may be structured to rotatably support the end part on the opposite-to-output side of the rotation shaft in an axial direction and a radial direction. Specifically, the opposite-to-output side bearing is formed in a bottomed cylindrical shape having a bearing recessed part, and the end part on the opposite-to-output side of the rotation shaft is inserted into the bearing recessed part so as to abut with a bottom face of the bearing recessed part.

Further, in accordance with the embodiment of the present invention, positional displacement of the urging member to the frame is prevented and thus variation of the working point of the urging member is prevented and the urging force to the rotation shaft is stabilized. In addition, in accordance with the embodiment of the present invention, an engagement part with the frame like a conventional example is not required in the urging member and thus the structure of the urging member is simplified.

In accordance with an embodiment of the present invention, the shaft support part is formed by press blanking work in which the shaft support part is punched from the output side face toward an opposite-to-output side face, i.e., toward a face on an opposite-to-output side of the shaft support part. According to this structure, since burr is not formed on the output side face, the urging member and the output side face are adequately brought into close contact with each other at the time of welding. Therefore, the urging member and the frame are further firmly fixed to each other and thus impact resistance of the motor is improved surely.

In accordance with an embodiment of the present invention, an output side bearing is provided for supporting the end part on the output side of the rotation shaft, and a bearing hole is formed in the shaft support part so as to penetrate through the shaft support part and on which the output side bearing is disposed. The bearing hole is formed by press blanking work where the bearing hole is punched from the output side face toward the opposite-to-output side face so that a length of sheared face in an axial direction of the rotation shaft is set to be longer than a length of fracture face. According to this structure, since burr is not formed on the output side face at the edge portion of the bearing hole, the urging member and the output side face are adequately brought into close contact with each other at the time of welding of the urging member. Further, a region of the sheared face which is more smooth than the fracture face is secured longer and thus variation of the diameter of the bearing hole in the axial direction is restrained and inclination of the output side bearing which is disposed on the bearing hole is suppressed. Therefore, the output side bearing disposed on the bearing hole can be smoothly moved in the axial direction.

In accordance with an embodiment of the present invention, the urging member is a flat spring (leaf spring). According to this structure, a structure for urging the end part on the output side of the rotation shaft to the opposite-to-output side is simplified. In this case, the flat spring is preferably provided with a bearing abutting part for urging the end part on the output side of the rotation shaft to the opposite-to-output side bearing and a flat face part having a welded part so that the bearing abutting part of the flat spring urges the output side bearing toward the opposite-to-output side bearing by means of that the flat face part of the flat spring is welded and fixed to the output side face of the shaft support part.

In accordance with an embodiment of the present invention, the flat spring is fixed to the output side face by projection welding, and a plurality of projection welded parts for fixing the flat spring to the output side face is formed between the flat spring and the output side face. In the case of projection welding, a plurality of the welding protruded parts can be welded without changing arrangement of an electrode for welding. Therefore, according to this structure, manufacturing steps of the motor can be simplified.

In accordance with an embodiment of the present invention, the flat spring is formed with a welded trace of the welding protruded part which is abutted with the output side face at the time of the projection welding. In other words, it is preferable that a protruded part for projection welding has been formed on the flat spring before welding instead of forming a protruded part for projection welding on the shaft support part before welding. The shaft support part is, for example, formed with the bearing hole where the bearing for supporting the rotation shaft is disposed. Therefore, according to this structure, for example, deformation of the bearing hole, which may occur due to forming of the welding protruded parts on the side face part, is prevented.

In accordance with an embodiment of the present invention, the flat spring is formed by press blanking work by which the flat spring is punched from a side fixed to the output side face. According to this structure, in the state where the flat spring is fixed to the output side face of the shaft support part, the burr is not formed on the face of the flat spring which faces the output side face of the shaft support part. Therefore, at the time of welding of the flat spring to the output side face of the shaft support part, the flat spring is further adequately brought into close contact with the output side face.

In accordance with an embodiment of the present invention, the flat spring urges the output side bearing to the opposite-to-output side, and the output side bearing is disposed on the bearing hole in a movable state in the axial direction of the rotation shaft, and the flat spring is formed with a slipping-out preventive part for preventing coming-off of the output side bearing from the bearing hole, and a welded part which fixes the flat spring to the output side face is formed at least in a vicinity of the slipping-out preventive part. According to this structure, the flat spring is fixed at least in the vicinity of the slipping-out preventive part which is a working point of force. Therefore, even when the slipping-out preventive part for the output side bearing is formed in the flat spring, fixed strength of the flat spring is increased. Specifically, it is preferable that the bearing abutting part of the flat spring is formed to protrude from the flat face part in an elongated shape and, in addition, the flat spring is formed with a slipping-out preventive part so as to protrude for preventing coming-off of the output side bearing from the bearing hole, and the welded part which fixes the flat face part of the flat spring to the output side face is formed in a vicinity of the slipping-out preventive part and at both side positions in a root portion of the bearing abutting part formed in the elongated shape.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 6(A) is its front view, FIG. 6(B) is its sectional view showing the "H-H" cross section in FIG. 6(A), FIG. 6(C) is its rear view, and FIG. 6(D) is its bottom view.

FIG. 7(A) is its front view, FIG. 7(B) is its side view, and FIG. 7(C) is a sectional view showing the "J-J" cross section in FIG. 7(A).

FIG. 9(A) is a view showing a state before welding and FIG. 9(B) is a view showing a state after welded.

DETAILED DESCRIPTION OF THE PREFERRED EMBODIMENTS

An embodiment of the present invention will be described below with reference to the accompanying drawings.

Figure 1:
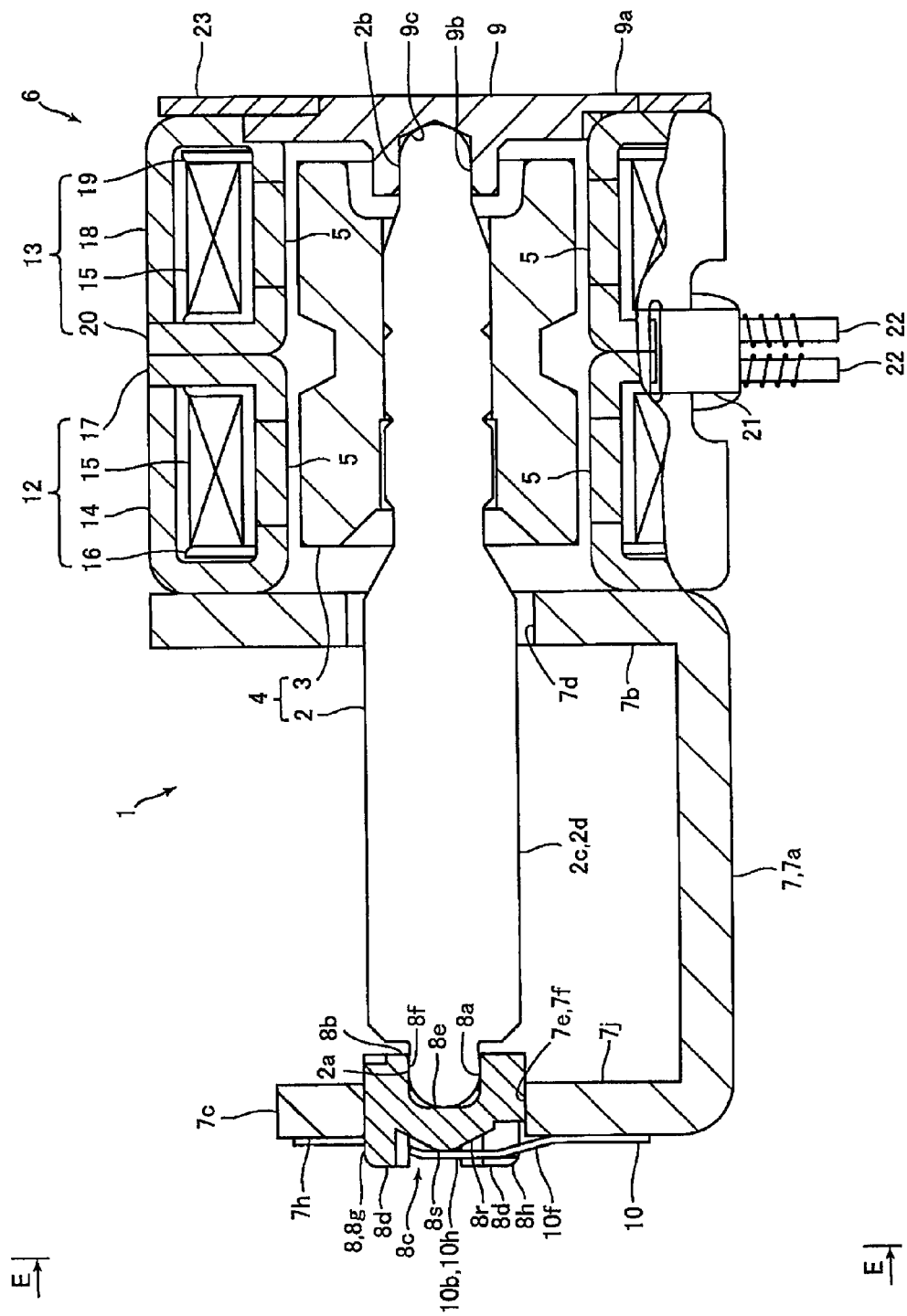
FIG. 1 is a sectional side view showing a motor in accordance with an embodiment of the present invention.

FIG. 1 is a sectional side view showing a motor 1 in accordance with an embodiment of the present invention.

The motor 1 in this embodiment is a so-called PM (Permanent Magnet) type stepping motor. The motor 1 includes, as shown in FIG. 1, a rotor 4 having a rotation shaft 2 and a permanent magnet 3 in a cylindrical shape, a stator 6 having pole teeth 5 which is disposed on an outer side in a radial direction of the permanent magnet 3 so as to face the permanent magnet 3, and a frame 7 which is attached to the stator 6 on an output side of the rotation shaft 2. Further, the motor 1 includes an output side bearing 8, which supports an end part 2a on the output side of the rotation shaft 2 (left end part in FIG. 1), an opposite-to-output side bearing 9, which supports an end part 2b on an opposite-to-output side of rotation shaft 2 (right end part in FIG. 1), and a flat spring (leaf spring) 10 as an urging member for urging the rotation shaft 2 to the opposite-to-output side.

In the following descriptions in this specification, a left side in FIG. 1 which is an output side of the rotation shaft 2 is referred to as "tip end side" and a right side in FIG. 1 which is an opposite-to-output side of the rotation shaft 2 is referred to as "rear end side". Further, upper and lower directions in FIG. 1 are referred to as "upper and lower directions" and directions perpendicular to the paper face of FIG. 1 are referred to as "lateral (right and left) directions". Further, the end part 2a on the output side of the rotation shaft 2 is referred to as the "tip end part 2a" and the end part 2b on the opposite-to-output side of the rotation shaft 2 is referred to as the "rear end part 2b".

The rotation shaft 2 is formed of metal such as stainless steel, aluminum or brass. A tip end of the tip end part 2a and a rear end of the rear end part 2b of the rotation shaft 2 are formed in a hemispherical shape. Diameters of the tip end part 2a and the rear end part 2b are set to be smaller than a diameter of other portion of the rotation shaft 2. A permanent magnet 3 is fixed to a rear end part 2b side of the rotation shaft 2. A tip end part 2a side of the rotation shaft 2 is a protruded part 2c which protrudes from the stator 6. A lead screw 2d is formed on the protruded part 2c. The lead screw 2d is engaged, for example, with a moved body such as an optical pickup device to move the moved body.

The stator 6 is provided with a first stator assembly 12 and a second stator assembly 13. The first stator assembly 12 and the second stator assembly 13 are disposed so as to superpose on each other in the axial direction.

The first stator assembly 12 includes a first outer stator core 14, a first bobbin 16 around which a coil 15 is wound, and a first inner stator core 17 which sandwiches the first bobbin 16 together with the first outer stator core 14 therebetween. The first stator assembly 12 is disposed on an outer peripheral side of a tip end side portion of the permanent magnet 3. A plurality of pole teeth 5 which is formed in each of the first outer stator core 14 and the first inner stator core 16 is disposed on an inner peripheral side of the first bobbin 16 so that respective pole teeth 5 are alternately and adjacently disposed in a circumferential direction. In other words, the pole teeth 5 formed in the first outer stator core 14 and the pole teeth 5 formed in the first inner stator core 16 are disposed on the inner peripheral side of the first bobbin 16 so as to be alternately and adjacently arranged each other.

The second stator assembly 13 includes a second outer stator core 18, a second bobbin 19 around which a coil 15 is wound, and a second inner stator core 20 which sandwiches the second bobbin 19 together with the second outer stator core 18 therebetween. The second stator assembly 13 is disposed on an outer peripheral side of a rear end side portion of the permanent magnet 3. A plurality of pole teeth 5 which is formed in each of the second outer stator core 18 and the second inner stator core 20 is disposed on an inner peripheral side of the second bobbin 19 so that respective pole teeth 5 are alternately and adjacently disposed in a circumferential direction. In other words, the pole teeth 5 formed in the second outer stator core 18 and the pole teeth 5 formed in the second inner stator core 20 are disposed on the inner peripheral side of the second bobbin 19 so as to be alternately and adjacently arranged each other.

In this embodiment, an outer peripheral portion of the first outer stator core 14 functions as a case part for covering an outer peripheral portion of the coil 15. Similarly, an outer peripheral portion of the second outer stator core 18 functions as a case part for covering an outer peripheral portion of the coil 15.

A terminal block 21 projecting on an outer side in a radial direction is integrally formed with the first bobbin 16 and the second bobbin 19 at a position between the first bobbin 16 and the second bobbin 19 in the axial direction. Terminal pins 22 are fixed to the terminal block 21 for supplying an electric current to the coils 15. End parts of the coils 15 are wound around the terminal pins 22.

The opposite-to-output side bearing 9 is formed of resin and formed in a bottomed cylindrical shape having a flange part 9a which is disposed on the rear end side. The opposite-to-output side bearing 9 is formed with a bearing recessed part 9b, which is recessed from the tip end of the opposite-to-output side bearing 9 toward the rear end side and into which the rear end part 2b of the rotation shaft 2 is inserted. The rear end of the rear end part 2b of the rotation shaft 2 is abutted with a bottom face 9c of the bearing recessed part 9b. The bearing recessed part 9b is formed in a circular shape when viewed in the axial direction. An inner diameter of the bearing recessed part 9b is set to be slightly larger than a diameter of the rear end part 2b and thus a slight gap is formed between an outer peripheral face in the radial direction of the rear end part 2b and an inner peripheral face of the bearing recessed part 9b, which is faced with the outer peripheral face in the radial direction of the rear end part 2b. The bottom face 9c of the bearing recessed part 9b is formed in a conical or a pyramidal shape.

As shown in FIG. 1, the rear end of the rotation shaft 2 which is urged toward the rear end side by the flat spring 10 (specifically, the rear end of the rear end part 2b which is formed in a hemispherical shape) is abutted with the bottom face 9c of the bearing recessed part 9b and thus the rear end of the rotation shaft 2 is supported in the radial direction and the axial direction by the opposite-to-output side bearing 9 through the bottom face 9c. Further, since the bottom face 9c of the bearing recessed part 9b is formed in a conical or a pyramidal shape, the opposite-to-output side bearing 9 is provided with a centering function of the rotation shaft 2. In other words, in the motor 1 in this embodiment, centering of the rotation shaft 2 is performed by the opposite-to-output side bearing 9. Further, in this embodiment, the bottom face 9c of the bearing recessed part 9b is formed in a conical or a pyramidal shape and thus the rear end of the rotation shaft 2 is brought into line contact with the bottom face 9c. Therefore, sliding loss between the rear end of the rotation shaft 2 and the opposite-to-output side bearing 9 is reduced.

A rear end face of the stator 6 (specifically, the rear end face of the second stator core 18) is fixed with an end plate 23 which is formed of a thin metal plate such as a stainless steel plate. For example, the end plate 23 is fixed to the rear end face of the stator 6 by welding. The opposite-to-output side bearing 9 is fixed to the stator 6 by the end plate 23. Specifically, a part of the flange part 9a is sandwiched between a part of the rear end face of the second outer stator core 18 and the end plate 23 in the axial direction and, as a result, the opposite-to-output side bearing 9 is fixed to the stator 6.

Figure 2:
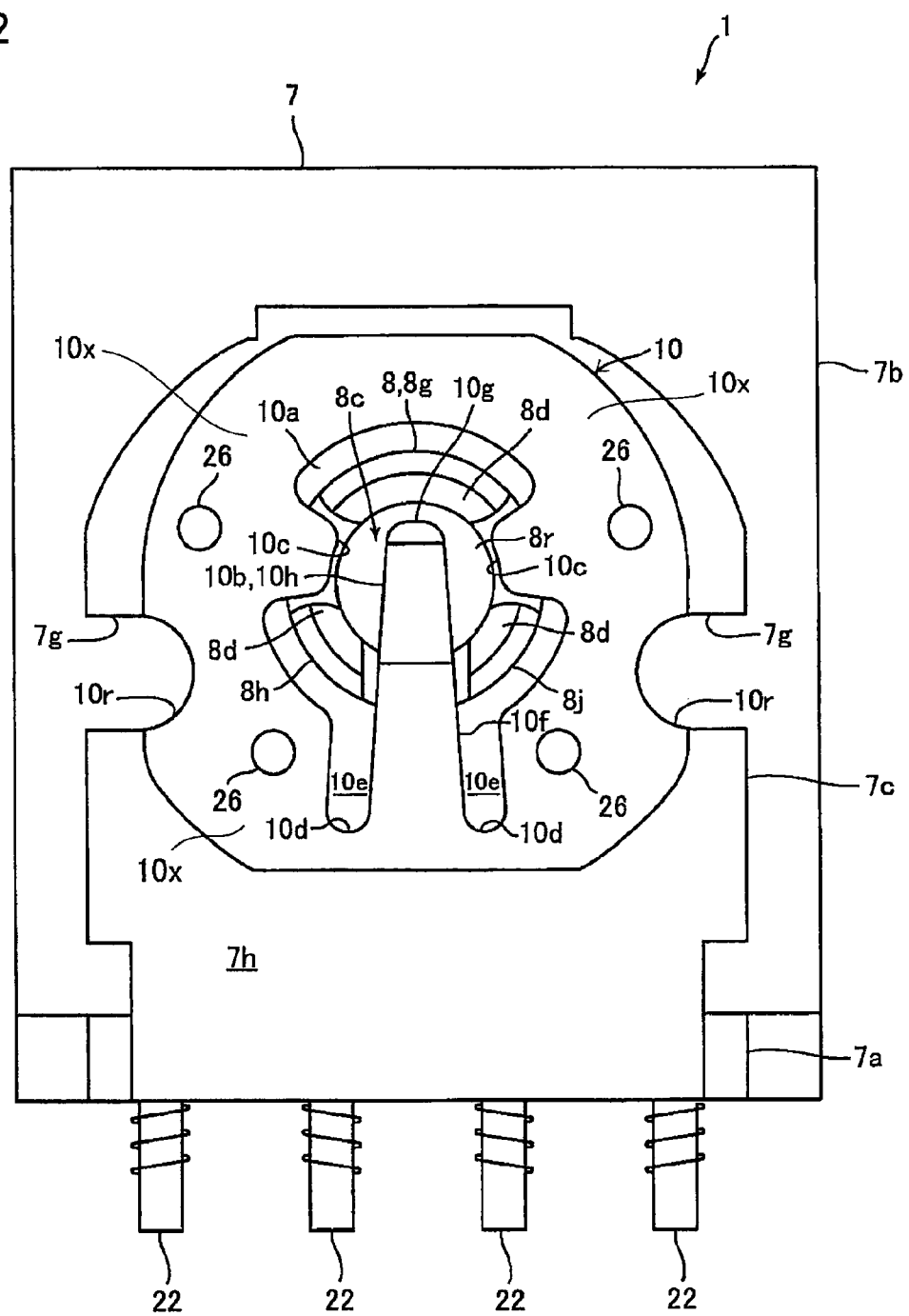
FIG. 2 is a view showing the motor which is viewed from the "E-E" direction in FIG. 1.
Figure 3:
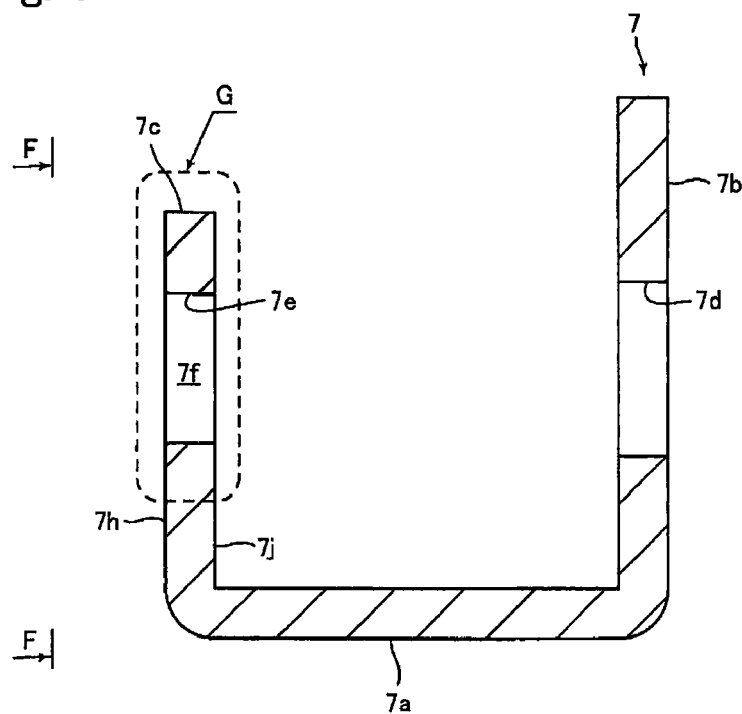
FIG. 3 is a sectional side view showing the frame in FIG. 1.
Figure 4:
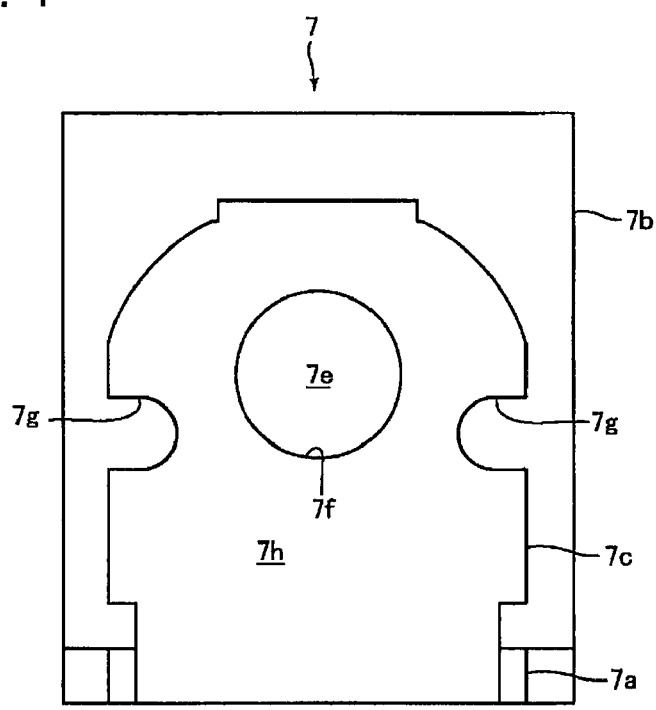
FIG. 4 is a view showing the frame which is viewed from the "F-F" direction in FIG. 3.
Figure 5:
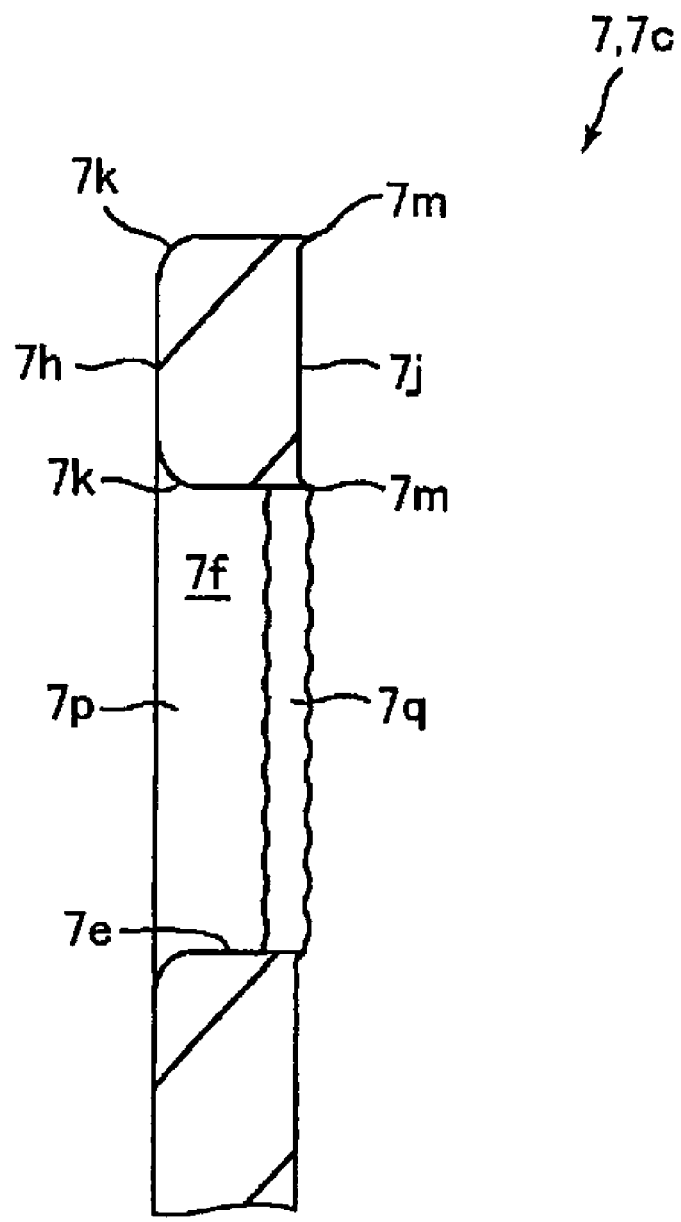
FIG. 5 is an enlarged sectional view showing the "G" part in FIG. 3.
Figure 6C:
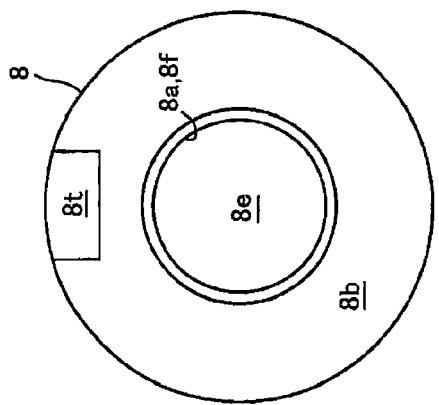
FIGS. 6(A) through 6(D) are views showing an output side bearing shown in FIG. 1.
Figure 6B:
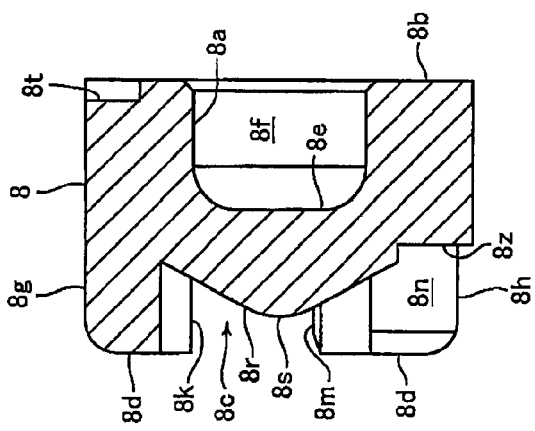
Figure 6A:
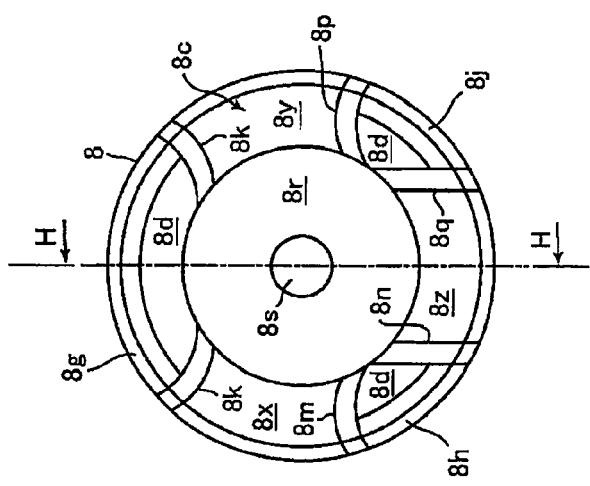
Figure 6D:
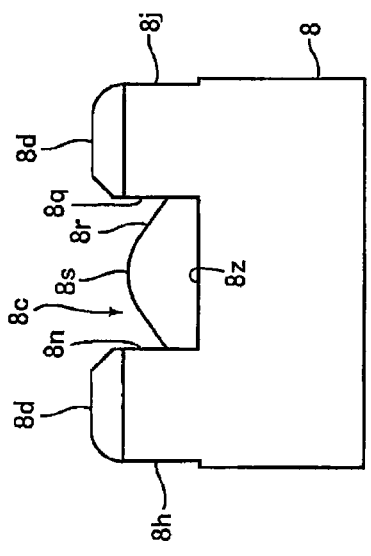
Figure 7A:
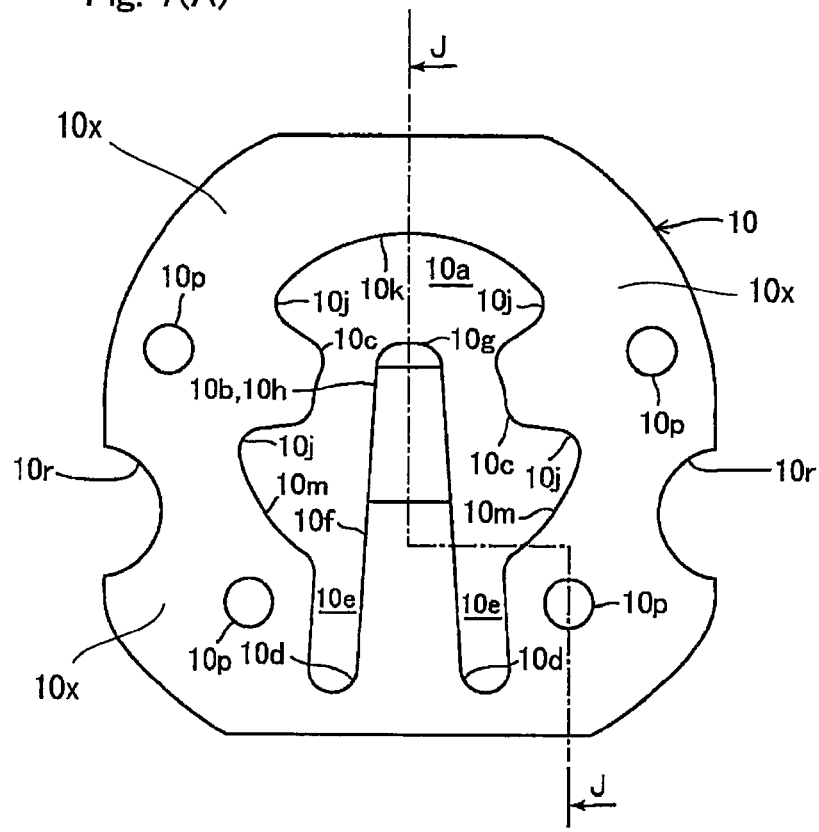
FIGS. 7(A) through 7(C) are views showing the flat spring in FIG. 1.
Figure 7B:
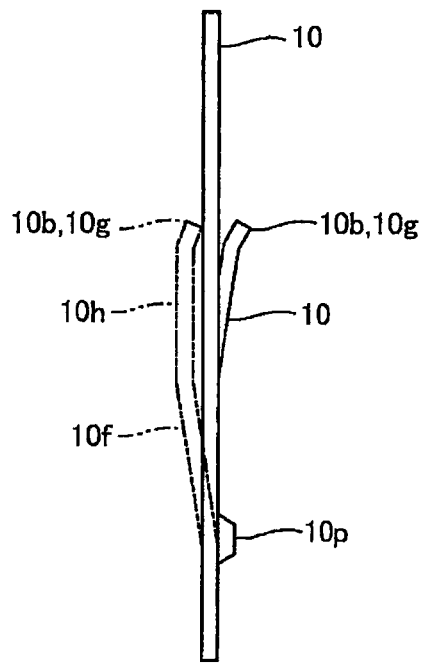
Figure 7C:
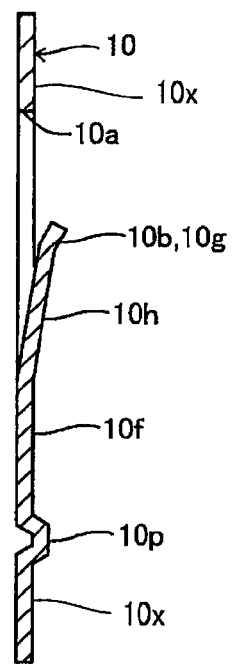
Figure 8:
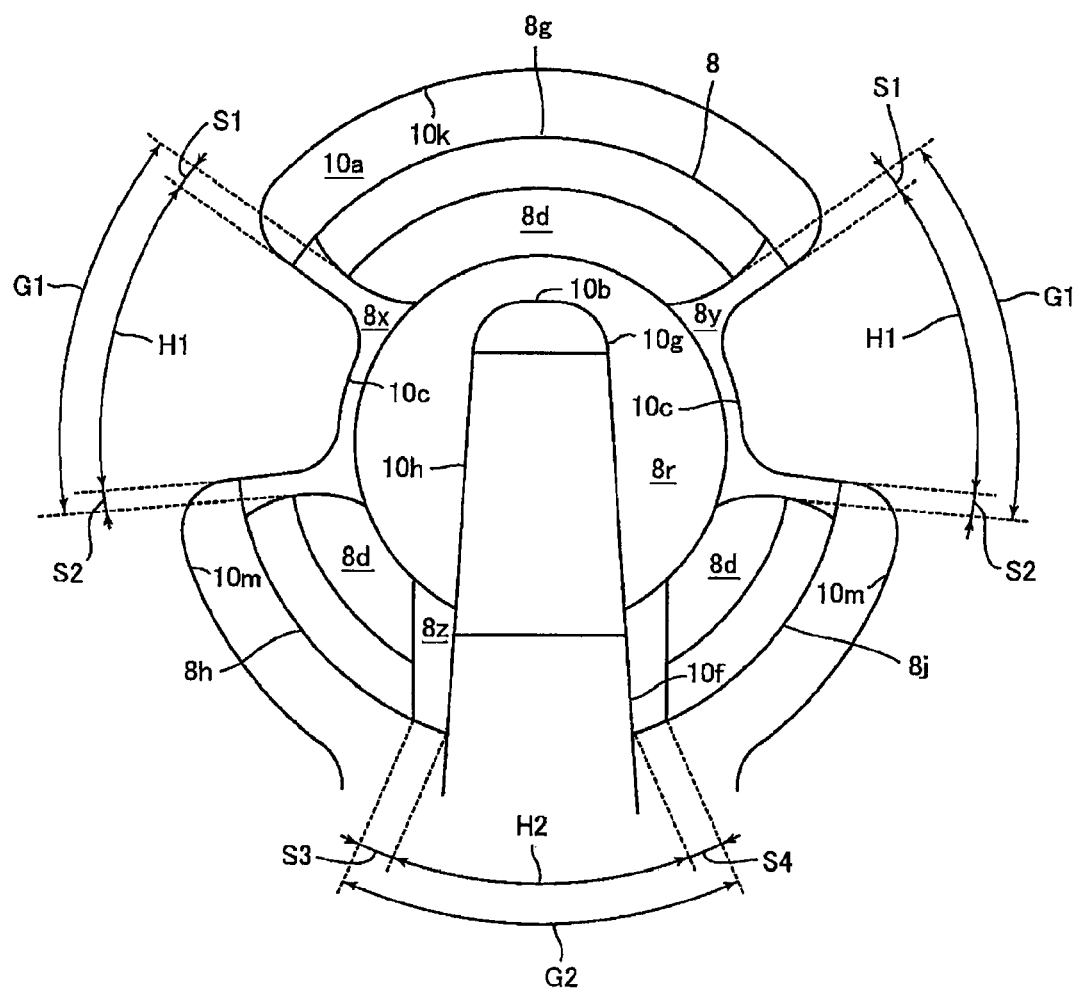
FIG. 8 is an enlarged view showing a center portion in FIG. 2.
Figure 9A:
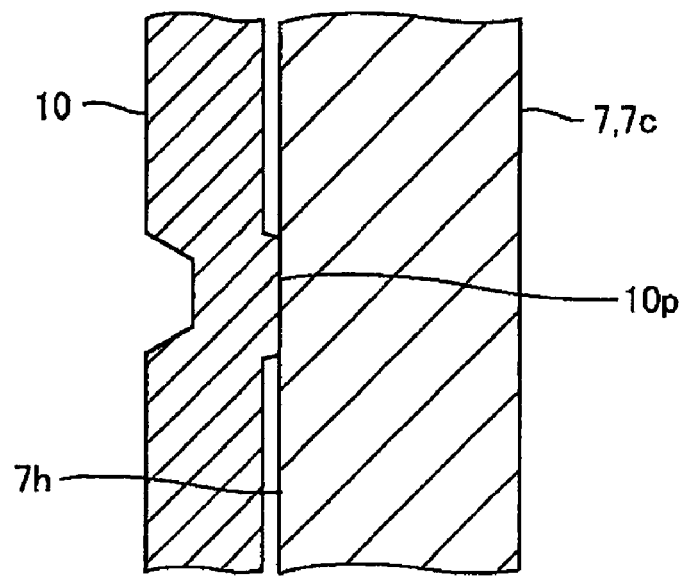
FIGS. 9(A) and 9(B) are schematic views for explaining formed trace of a welding protruded part shown in FIG. 2.
Figure 9B:
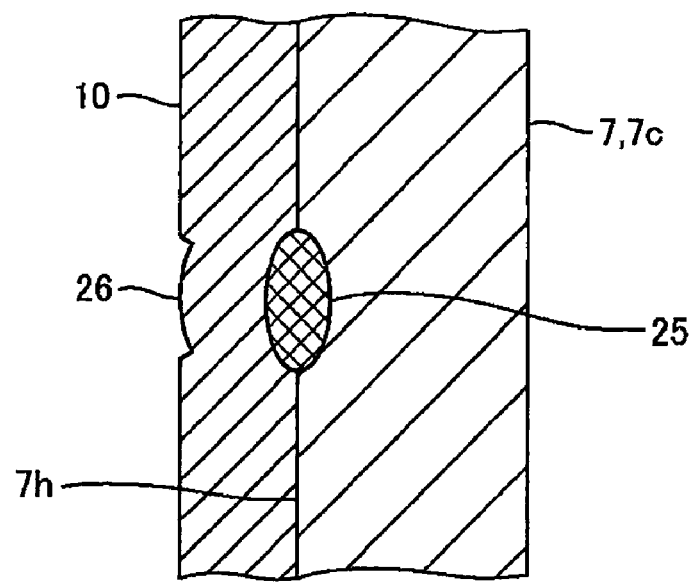

FIG. 2 is a view showing the motor 1 which is viewed from the "E-E" direction in FIG. 1. FIG. 3 is a sectional side view showing the frame 7 in FIG. 1. FIG. 4 is a view showing the frame 1 which is viewed from the "F-F" direction in FIG. 3. FIG. 5 is an enlarged sectional view showing the "G" part in FIG. 3. FIGS. 6(A) through 6(D) are views showing the output side bearing 8 shown in FIG. 1. FIG. 6(A) is its front view, FIG. 6(B) is its sectional view showing the "H-H" cross section in FIG. 6(A), FIG. 6(C) is its rear view, and FIG. 6(D) is its bottom view. FIGS. 7(A) through 7(C) are views showing the flat spring 10 in FIG. 1. FIG. 7(A) is its front view, FIG. 7(B) is its side view, and FIG. 7(C) is a sectional view showing the "J-J" cross section in FIG. 7(A). FIG. 8 is an enlarged view showing a center portion in FIG. 2. FIGS. 9(A) and 9(B) are schematic views for explaining formed trace 26 of a welding protruded part 10p shown in FIG. 2. FIG. 9(A) is a view showing a state before welding and FIG. 9(B) is a view showing a state after welded.

The frame 7 is a metal frame which is formed of a metal thin plate such as electrogalvanized steel plate (SECC) or cold rolled steel plate (SPCC). A thickness of the frame 7 is, for example, 0.6 mm and thus the thickness of the frame 7 is very thin. The frame 7 includes a bottom face part 7a and two side face part 7b and 7c, which are formed in a manner to stand up from the bottom face part 7a and is disposed to face each other and thus the frame 7 is formed in a rectangular groove shape (U-shape in cross section). The frame 7 may be formed of another metal thin plate such as a stainless steel plate.

The side face part 7b is disposed on the rear end side and is fixed to the stator 6. In other words, the side face part 7b in this embodiment is a stator fixing part to which the stator 6 is fixed. The side face part 7c is disposed on the tip end side to support the tip end part 2a of the rotation shaft 2. Specifically, the side face part 7c holds the output side bearing 8 which supports the tip end part 2a of the rotation shaft 2. In other words, the side face part 7c is a shaft support part which supports the tip end part 2a of the rotation shaft 2 and, in addition, is also a bearing holding part which holds the output side bearing 8. The side face part 7b is fixed to the stator 6 by welding such as projection welding, spot welding or laser welding.

As shown in FIG. 1, the side face part 7b is formed with an insertion hole 7d, into which the rotation shaft 2 is inserted, so as to penetrate through the side face part 7b. A diameter of the insertion hole 7d is formed larger than a diameter of the rotation shaft 2 and thus a gap space is formed between the inner peripheral face of the insertion hole 7d and the rotation shaft 2.

As shown in FIGS. 3 and 4, the side face part 7c is formed with a circular bearing hole 7e, on which the output side bearing 8 is mounted, so as to penetrate through the side face part 7c. A diameter of the bearing hole 7e is formed slightly larger than a diameter of the output side bearing 8 and thus the output side bearing 8 which is mounted on the bearing hole 7e is movable along an inner peripheral face 7f of the bearing hole 7e in the axial direction. In this embodiment, the output side bearing 8 is supported to be movable along the inner peripheral face of the bearing hole 7e. In other words, the output side bearing 8 is supported over a board thickness of the side face part 7c to be movable in the axial direction.

Further, as shown in FIG. 4, the side face part 7c is formed with positioning recessed parts 7g for positioning the flat spring 10 to the side face part 7c. Specifically, two positioning recessed parts 7g are formed in the side face part 7c so as to recess from both ends of the side face part 7c toward inner sides in the lateral directions. Inner side ends in the lateral directions of the positioning recessed parts 7g are formed in a semicircular curved face.

The frame 7 in this embodiment is formed by press working. Specifically, the frame 7 is formed by press blanking work and press bending work. For example, an outward form of the bottom face part 7a and the side face parts 7b and 7c is formed by press blanking work and, after that, the side face parts 7b and 7c are bent at substantially 90° (degree) with respect to the bottom face part 7a by press bending work to form the frame 7. In this embodiment, the insertion hole 7d of the side face part 7b and the bearing hole 7e of the side face part 7c is formed by press blanking work at the time of forming the outward form of the bottom face part 7a and the side face parts 7b and 7c.

At the time of press blanking work for the frame 7, the frame 7 is punched from an outer side in the bending direction of the frame 7 toward an inner side in the bending direction, i.e., the frame 7 is punched from the outer side toward the inner side in FIG. 3. In other words, at the time of press blanking work, the side face part 7c is formed by means of that the frame 7 is punched from an output side face 7h disposed on an output side toward an opposite-to-output side face 7j disposed on an opposite-to-output side. Therefore, as shown in FIG. 5, edge parts of the output side face 7h (specifically, an upper edge part and both right and left edge parts of the output side face 7h and an edge part of the bearing hole 7e) are formed as a round part 7k at the time of press blanking work. On the other hand, a burr part 7m is formed at edge parts of the opposite-to-output side face 7j (specifically, an upper edge part and both right and left edge parts of the opposite-to-output side face 7j and an edge part of the bearing hole 7e) at the time of press blanking work. In FIG. 5, for convenience, the round part 7k and the burr part 7m are exaggeratedly shown.

Further, in the inner peripheral face 7f of the bearing hole 7e in this embodiment, as shown in FIG. 5, a length of a sheared face 7p which is formed at the time of press blanking work (length in the axial direction, i.e., a board thickness direction of the side face part 7c) is set to be longer than a length of a fracture face 7q (length in the axial direction, i.e., the board thickness direction of the side face part 7c). For example, the length of the sheared face 7p is set to be 70% or more of the board thickness of the side face part 7c and, specifically, 90% or more of the board thickness of the side face part 7c. Further, in the inner peripheral face 7f of the bearing hole 7e in this embodiment, an area of the sheared face 7p is larger than an area of the fracture face 7q. For example, the area of the sheared face 7p is set to be 70% or more than the entire area of the inner peripheral face 7f and, specifically, 90% or more than the entire area of the inner peripheral face 7f. In this embodiment, the bearing hole 7e is formed by, for example, a so-called shaving work in which finish blanking work is performed after a prepared hole has been opened.

The output side bearing 8 is formed of resin. For example, the output side bearing 8 is formed of resin such as PBT (polybutylene terephthalate), LCP (liquid crystal polymer), POM (polyacetal) or PPS (polyphenylene sulfide). The output side bearing 8 is formed in a bottomed cylindrical shape whose opposite-to-output side (rear end side) is opened. The output side bearing 8 is inserted into the bearing hole 7e of the frame 7 in a state that the output side bearing 8 is movable in the axial direction. Specifically, as shown in FIG. 1, the output side bearing 8 is disposed on the bearing hole 7e in a state that both ends of the output side bearing 8 in the axial direction are protruded from the output side face 7h and the opposite-to-output side face 7j of the side face part 7c. In other words, in this embodiment, a length in the axial direction of the output side bearing 8 is set to be longer than the board thickness of the frame 7. In accordance with an embodiment of the present invention, the output side bearing 8 may be formed of metal material which is superior in sliding property such as copper based sintered metal material.

As shown in FIGS. 6(A) through 6(D), the output side bearing 8 is formed with a bearing recessed part 8a, into which the tip end part 2a of the rotation shaft 2 is inserted, so as to recess from the rear end face 8b of the output side bearing 8 toward the tip end side. Further, the output side bearing 8 is formed with an arranging recessed part 8c for disposing the flat spring 10 so as to be recessed from the tip end face 8d toward the rear end side.

As shown in FIG. 6(C), the bearing recessed part 8a is formed in a circular shape when viewed in the axial direction and an inner diameter of the bearing recessed part 8a is set to be slightly larger than a diameter of the tip end part 2a of the rotation shaft 2. Further, a bottom face 8e of the bearing recessed part 8a is formed in a flat shape. In this embodiment, an inner peripheral face 8f of the bearing recessed part 8a supports the tip end part 2a of the rotation shaft 2 in the radial direction. Further, in this embodiment, the output side bearing 8 is urged toward the rear end side by the flat spring 10 and thus the bottom face 8e is contacted with the tip end part 2a of the rotation shaft 2 to support in the axial direction. In other words, in this embodiment, the tip end part 2a of the rotation shaft 2 is rotatably supported by the inner peripheral face 8f and the bottom face 8e of the bearing recessed part 8a in the axial direction and the radial direction.

As shown in FIG. 6(A), the arranging recessed part 8c is formed in a roughly "T"-shape. In other words, an outer peripheral portion of the tip end side of the output side bearing 8 is formed with three projecting parts 8g, 8h and 8j which protrude toward the tip end side so as to have predetermined spaces in the circumferential direction. Specifically, three projecting parts 8g through 8j are formed at a roughly 120° pitch. Further, flat parts 8x, 8y and 8z which are perpendicular to the axial direction are formed between the respective projecting parts 8g through 8j in the circumferential direction. Outer peripheral faces of the projecting parts 8g through 8j structure a part of the outer peripheral face of the output side bearing 8.

As shown in FIG. 6(A), the projecting part 8g is symmetrically formed in the right and left directions and is disposed on an upper end side of the output side bearing 8. Both ends 8k in the circumferential direction of the projecting part 8g is formed in a curved face shape. The projecting part 8h is disposed on a left hand side of a lower end side of the output side bearing 8. A clockwise end 8m of the projecting part 8h is formed in a curved face shape and a counterclockwise end 8n is formed in a flat face which is parallel to a plane formed in the axial direction and the upper and lower directions. Further, the projecting part 8j is disposed on a right side of the lower end side of the output side bearing 8. A counterclockwise end 8p of the projecting part 8j is formed in a curved face shape and a clockwise end 8q is formed in a flat face which is parallel to a plane formed in the axial direction and the upper and lower directions. In this embodiment, the projecting part 8h and the projecting part 8j are symmetrically formed in the right and left directions.

The flat part 8x is formed between the projecting part 8g and the projecting part 8h, and the flat part 8y is formed between the projecting part 8g and the projecting part 8j. Further, the flat part 8z is formed between the projecting part 8h and the projecting part 8j.

A spring abutting part 8r with which the flat spring 10 is abutted is formed at a center portion in the radial direction of the arranging recessed part 8c so as to protrude toward the tip end side. Specifically, the spring abutting part 8r which protrudes in a substantially conical shape toward the tip end side is formed at the center portion in the radial direction of the arranging recessed part 8c. A protruding amount of the spring abutting part 8r is set to be smaller than protruding amounts of the projecting parts 8g through 8j. For example, as shown in FIG. 6(B), the protruding amount of the spring abutting part 8r is approximately half of the protruding amounts of the projecting parts 8g through 8j. The tip end 8s of the spring abutting part 8r is formed in a smooth surface shape.

In this embodiment, a space in the axial direction which is formed between the flat parts 8x through 8z and the spring abutting part 8r and the tip ends 8d of the output side bearing 8 is the arranging recessed part 8c.

Further, as shown in FIGS. 6(B) and 6(C), a confirming recessed part 8t is formed on the rear end face 8b of the output side bearing 8 for confirming a mounting direction of the output side bearing 8 formed in a bottomed cylindrical shape on the frame 7.

The flat spring 10 is formed of a metal thin plate such as a stainless steel plate. For example, a thickness of the flat spring 10 is 0.1 mm. The flat spring 10 in this embodiment is formed by press working. Specifically, the flat spring 10 is formed by press blanking work and press bending work. At the time of press blanking work for the flat spring 10, the flat spring 10 is punched from a right side in FIG. 7(B) toward a left side. In other words, the flat spring 10 is punched by press blanking work so that, when the flat spring 10 has been attached on the output side face 7h of the frame 7, round parts formed by the press blanking work are located on the rear end side and burr parts are located on the tip end side, i.e., so that the burr parts are not located on the face of the flat spring 10 which faces the output side face 7h of the frame 7.

As shown in FIG. 7(A), the flat spring 10 is formed of a flat plate in a roughly circular shape and a through hole 10a is formed at a center portion of the flat spring 10. Further, the flat spring 10 is formed with the bearing abutting part 10b, which is abutted with the spring abutting part 8r of the output side bearing 8 to urge the output side bearing 8 toward the opposite-to-output side (rear end side), and two protruded parts 10c as a slipping-out preventive part for preventing the output side bearing 8 from coming out from the bearing hole 7e of the frame 7.

The bearing abutting part 10b is formed to protrude from an edge 10d on the lower end side of the through hole 10a toward the center side of the through hole 10a in an elongated shape. Further, the bearing abutting part 10b is, as shown in FIG. 7(B), formed to be capable of being resiliently bent toward the tip end side with the lower end side as a supporting point. The through hole 10a is extended on the right and left sides of the bearing abutting part 10b in a slit-like manner toward the lower direction for securing an urging force of the bearing abutting part 10b. In other words, slit parts 10e structuring a part of the through hole 10a are formed on the right and left sides of the bearing abutting part 10b.

Further, as shown in FIG. 7(C), the bearing abutting part 10b is bent at two positions toward the rear end side and it is structured of a lower end part 10f which is disposed on the lower end side, an upper end part 10g disposed on the upper end, and an intermediate part 10h disposed between the lower end part 10f and the upper end part 10g. In this embodiment, when the flat spring 10 has been assembled into the motor 1, as shown in FIG. 1, the lower end part 10f is resiliently bent and the intermediate part 10h is abutted with the tip end 8s of the spring abutting part 8r. Further, the upper end of the upper end part 10g is disposed within the arranging recessed part 8c on the rear end side with respect to the tip end 8s of the spring abutting part 8r of the output side bearing 8.

The protruded parts 10c are formed to protrude from edges 10j of the right and left ends of the through hole 10a toward the center side of the through hole 10a. The protruded part 10c is, as shown in FIG. 7(A), formed in a roughly trapezoid shape. Further, two protruded parts 10c are disposed in a symmetrical manner in the right and left directions. In this embodiment, the flat spring 10 is fixed on the output side face 7h of the frame 7b by means of that a flat face part 10x on its outer peripheral side is welded, and the protruded parts 10c are protruded toward the bearing abutting part 10b from the flat face part 10x for preventing the output side bearing 8 from coming out from the bearing hole 7e toward the tip end side.

An edge 10k of the flat face part 10x along the through hole 10a between the two protruded parts 10c is formed in a circular arc shape. Further, edges 10m of the flat face part 10x along the through hole 10a between the protruded parts 10c and the slit parts 10e are formed in a circular arc shape.

The flat spring 10 in this embodiment is fixed on the output side face 7h of the frame 7 by welding of the flat face part 10x. Specifically, the flat spring 10 is fixed on the output side face 7h by projection welding. In this embodiment, the flat spring 10 is formed with welding protruded parts 10p on the flat face part 10x for performing projection welding. In other words, the flat spring 10 is formed with the welding protruded parts 10p before having been fixed and welded on the output side face 7h.

Specifically, the welding protruded parts 10p which protrude toward the rear end side are formed in the flat face part 10x of the flat spring 10 before having been fixed to the output side face 7h. As shown in FIG. 7(A), in this embodiment, the welding protruded part 10p is formed at four positions. Specifically, two welding protruded parts 10p are formed near respective root portions of the two protruded parts 10c and two welding protruded parts 10p are formed on outer sides of the slit parts 10e in the lateral direction. In accordance with an embodiment of the present invention, the welding protruded part 10p is formed at the time of press working. Further, in order to secure a stable urging force by the bearing abutting part 10b, the welding protruded parts 10p are preferably formed at least on outer sides of the slit parts 10e in the lateral directions (i.e., root portions of the bearing abutting part 10b).

Further, an outer peripheral side of the flat spring 10 is formed with positioning recessed parts 10r for positioning the flat spring 10 to the side face part 7c together with the positioning recessed parts 7g which is formed in the frame 7. Specifically, two positioning recessed parts 10r are formed in the flat spring 10 so as to recess from both ends of the flat spring 10 in the lateral directions toward inner sides in the lateral directions. The positioning recessed parts 10r are, as shown in FIG. 2, formed in a semicircular curved face similarly to the inner side ends in the lateral directions of the positioning recessed parts 7g formed in the frame 7.

As described above, the flat spring 10 is fixed to the output side face 7h of the frame 7 by welding. As shown in FIGS. 1 and 2, the bearing abutting part 10b and the protruded parts 10c of the flat spring 10, which is fixed to the output side face 7h, are disposed within the arranging recessed part 8c of the output side bearing 8 that is disposed in the bearing hole 7e of the frame 7. Specifically, the respective protruded parts 10c are disposed in the arranging recessed part 8c between the projecting part 8g and the projecting part 8h and between the projecting part 8g and the projecting part 8j, and the bearing abutting part 10b (specifically, the intermediate part 10h and a part of the lower end part 10f) is disposed in the arranging recessed part 8c between the projecting part 8h and the projecting part 8j. Further, the bearing abutting part 10b (specifically, the intermediate part 10h) of the flat spring 10 fixed to the output side face 7h is abutted with the tip end 8s of the spring abutting part 8r of the output side bearing 8.

In this embodiment, as shown in FIG. 8, a difference between an interval "G1", which is between the projecting part 8h or the projecting part 8j and the projecting part 8g in a circumferential direction, and a width "H1" of the protruded part 10c in the circumferential direction is set to be smaller than a difference between an interval "G2", which is between the projecting part 8h and the projecting part 8j in the circumferential direction, and a width "H2" of the bearing abutting part 10b (specifically, the lower end part 10f) in the circumferential direction. In other words, a sum of a gap space "S1" between the projecting part 8g and the protruded part 10c in the circumferential direction and a gap space "S2" between the projecting part 8h or the projecting part 8j and the protruded part 10c in the circumferential direction is set to be smaller than a sum of a gap space "S3" between the projecting part 8h and the bearing abutting part 10b in the circumferential direction and a gap space "S4" between the projecting part 8j and the bearing abutting part 10b in the circumferential direction.

In this embodiment, the bearing abutting part 10b and the protruded parts 10c which are disposed in the arranging recessed part 8c are disposed on the rear end side with respect to the tip end 8d of the output side bearing 8 and thus the bearing abutting part 10b and the protruded parts 10c are not protruded from the tip end 8d of the output side bearing 8 in the axial direction.

Further, as described above, the flat spring 10 is fixed to the output side face 7h of the frame 7 by projection welding. In other words, as shown in FIG. 9(A), in a state that a welding protruded part 10p of the flat spring 10 is abutted with the output side face 7h with a predetermined pressure, power is supplied to electrodes to fix the flat spring 10 to the output side face 7h. Therefore, as shown in FIG. 9(B), a welded part (projection welded part) 25 where the flat spring 10 and the output side face 7h are fixed to each other by welding is formed between the flat spring 10 and the output side face 7h. Further, as shown in FIGS. 2 and 9(B), the flat spring 10 fixed by welding is formed with a welding trace 26 of the welding protruded part 10p. In this embodiment, the welded part 25 and the welding trace 26 are formed at four positions, i.e., in the vicinity of each of the root portions of the two protruded parts 10c and the outer sides of the slit parts 10e in the lateral directions.

As described above, in this embodiment, the flat spring 10 is fixed to the output side face 7h of the frame 7 by welding. Therefore, the flat spring 10 for urging the tip end part 2a of the rotation shaft 2 is firmly fixed to the frame 7. Therefore, in this embodiment, displacement of mounting position of the flat spring 10 to the frame 7 and detachment of the flat spring 10 from the frame 7, which occur due to impact, are prevented. As a result, in this embodiment, impact resistance of the motor 1 is improved.

Further, in this embodiment, since the flat spring 10 is fixed to the output side face 7h of the frame 7 by welding, positional displacement of the flat spring 10 to the frame 7 is prevented and thus variation of a working point of the flat spring 10 is prevented. Therefore, the urging force to the rotation shaft 2 is stabilized. In addition, in this embodiment, the flat spring 10 is not required to form an engagement part with the frame 7, a structure of the flat spring 10 can be simplified. Further, in this embodiment, the positioning recessed parts 10r are formed on the outer peripheral face of the flat spring 10 for positioning the flat spring 10 to the side face part 7c together with the positioning recessed part 7g formed in the frame 7 and thus the flat spring 10 is firmly fixed to the appropriate position of the frame 7.

In this embodiment, the side face part 7c is formed by press blanking work in which the side face part 7c is punched from the output side face 7h to the opposite-to-output side face 7j and thus the edge part of the output side face 7h is formed to be the round part 7k formed at the time of press blanking work. Therefore, a burr is not formed on the output side face 7h. Therefore, the welding protruded parts 10p of the flat spring 10 and the output side face 7b can be tightly contacted with each other adequately at the time of welding. Especially, in this embodiment, the flat spring 10 is punched by press blanking work in which the flat spring 10 is punched from the side fixed to the output side face 7h to the other side (tip end side) so that a burr part is not formed on the face of the flat spring 10 which faces the output side face 7h when the flat spring 10 is welded and fixed to the output side face 7h of the frame 7. Therefore, the welding protruded part 10p of the flat spring 10 and the output side face 7b are further surely contacted with each other tightly at the time of welding. As a result, the flat spring 10 and the frame 7 are further firmly fixed to each other and thus impact resistance of the motor 1 is surely improved.

Further, in this embodiment, burrs are not formed on the output side face 7h of the frame 7 and the face of the flat spring 10 which is located on the side of the output side face 7h. In other words, burrs are formed in different directions and thus the flat spring 10 and the output side face 7b can be adequately brought into close contact with each other (contact with each other in face to face manner). In this embodiment, the through hole 10a of the flat spring 10 is formed larger than the bearing hole 7e of the frame 7 and thus the flat spring 10 is not abutted with the edge portion of the bearing hole 7e. Therefore, even when burrs are formed at the edge portion of the output side face 7h, the flat spring 10 is not caught by the burr.

In this embodiment, the flat spring 10 is fixed on the output side face 7h by projection welding and a plurality of welded parts 25 is formed between the flat spring 10 and the output side face 7h. In the case of projection welding, a plurality of portions where the welding protruded parts 10p are formed can be welded without changing arrangement of electrodes for welding and thus, in this embodiment, manufacturing steps of the motor 1 can be simplified.

In this embodiment, no protruded part for projection welding is formed on the side face part 7c before being welded and instead, the welding protruded part 10p for projection welding is formed on the flat spring 10 before welding. Therefore, deformation of the bearing hole 7e is prevented which may occur due to forming of welding protruded parts on the side face part 7c. Especially, in this embodiment, the output side bearing 8 is urged by the flat spring 10 to the opposite-to-output side and held in the state that the output side bearing 8 is slidable along the inner peripheral face of the bearing hole 7e in the axial direction. Therefore, since deformation of the bearing hole 7e is prevented, the output side bearing 8 is capable of being moved in the axial direction smoothly.

In this embodiment, the welded parts 25 for fixing the flat spring 10 to the output side face 7h are formed in the vicinity of the root portions of two protruded parts 10c and the outer sides in the lateral directions of the slit parts 10e. Therefore, the flat spring 10 is fixed at the root portion of the bearing abutting part 10b and the root portions of the protruded parts 10c which are working points of force. Therefore, fixed strength of the flat spring 10 can be increased.

Although the present invention has been shown and described with reference to a specific embodiment, various changes and modifications will be apparent to those skilled in the art from the teachings herein.

In the embodiment described above, the flat spring 10 is fixed to the output side face 7h of the frame 7 by projection welding. However, the present invention is not limited to this embodiment. For example, the flat spring 10 may be fixed to the output side face 7h by spot welding, in which the flat spring 10 and the output side face 7h are welded to each other by means of that power is supplied to electrodes in the state that the flat spring 10 and the output side face 7h are pressurized with the electrodes. Further, the flat spring 10 may be fixed to the output side face 7h by laser welding, in which the flat spring 10 and the output side face 7h are welded to each other by heat of a laser beam.

In the embodiment described above, the tip end part 2a of the rotation shaft 2 is disposed within the bearing recessed part 8a of the output side bearing 8 and the tip end part 2a of the rotation shaft 2 is supported in the axial direction by the output side bearing 8. However, the present invention is not limited to this embodiment. For example, as described in the above-mentioned Patent References, it may be structured that the flat spring 10 is directly abutted with the tip end part 2a of the rotation shaft 2 so that the tip end part 2a of the rotation shaft 2 is supported by the flat spring 10 in the axial direction.

In the embodiment described above, the output side bearing 8 is urged to the opposite-to-output side by the flat spring 10. However, the present invention is not limited to this embodiment. For example, the output side bearing 8 may be urged to the opposite-to-output side by a compression coil spring, washer spring or the like. In this case, the compression coil spring or the washer spring is disposed so as to abut with the tip end 8s of the spring abutting part 8r. Further, in this case, for example, a holding member which holds the compression coil spring or the washer spring is fixed to the output side face 7h of the frame 7 by welding. In this case, the compression coil spring or the washer spring and the holding member for holding the compression coil spring or the washer spring structure the urging member in the present invention for urging the end part on the output side of the rotation shaft 2 to the opposite-to-output side.

In the embodiment described above, two protruded parts 10c are formed in the flat spring 10 but the number of the protruded parts 10c formed in the flat spring 10 may be changed, for example, to one, three or more.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:
1. A motor having resistance to impacts comprising:
a rotor having a rotation shaft;
a stator which is disposed on an outer peripheral side of the rotor;
a frame which is fixed to the stator; and
an urging member made of metal for urging an end part on an output side of the rotation shaft to an opposite-to-output side;
wherein the frame comprises:
a bottom face part;
a stator fixing part which orientated in a bent shape relative to the bottom face part and which is fixed to the stator; and
a shaft support part which is orientated in a bent shape relative to the bottom face part so as to face the stator fixing part and which supports the end part on the output side of the rotation shaft; and
wherein the urging member is structurally fixed by a weld to an output side face which is a face on an output side of the shaft support part;
wherein the urging member is a flat spring which is provided with a bearing abutting part for urging the end part on the output side of the rotation shaft to the opposite-to-output side and a flat face part having a welded part that is fixed to the output side face of the shaft support part; and wherein the welded part which fixes the flat face part of the flat spring to the output side face is formed at both side positions in a root portion of the bearing abutting part.

2. The motor according to claim 1, wherein the shaft support part is structured by press blanking work in which the shaft support part is punched from the output side face toward an opposite-to-output side face which is a face on an opposite-to-output side of the shaft support part.

3. The motor according to claim 2, further comprising:
an output side bearing which supports the end part on the output side of the rotation shaft; and
a bearing hole which is formed in the shaft support part so as to penetrate through the shaft support part and on which the output side bearing is disposed;
wherein the bearing hole is formed by press blanking work where the bearing hole is punched from the output side face toward the opposite-to-output side face so that a length of sheared face in an axial direction of the rotation shaft is set to be longer than a length of fracture face.

4. The motor according to claim 1, wherein the flat spring is fixed to the output side face by projection welding and a plurality of projection welded parts for fixing the flat spring to the output side face is formed between the flat spring and the output side face.

5. The motor according to claim 4, wherein the flat spring is formed with welded trace of a welding protruded part, which is abutted with the output side face at a time of the projection welding.

6. The motor according to claim 1, wherein the flat spring is formed by press blanking work so that the flat spring is punched from a side which is fixed to the output side face.

7. The motor according to claim 1, further comprising:
an output side bearing which supports the end part on the output side of the rotation shaft; and
a bearing hole formed in the shaft support part so as to penetrate through the shaft support part and on which the output side bearing is disposed;
wherein the flat spring urges the output side bearing to the opposite-to-output side and the output side bearing is disposed on the bearing hole in a movable state in an axial direction of the rotation shaft,
the flat spring is formed with a slipping-out preventive part for preventing coming-off of the output side bearing from the bearing hole, and
the welded part is formed in vicinity of the slipping-out preventive part.

8. The motor according to claim 1, further comprising an opposite-to-output side bearing which is fixed to an end face on an opposite-to-output side of the stator in a non-movable state,
wherein the opposite-to-output side bearing rotatably supports an end part on an opposite-to-output side of the rotation shaft in an axial direction and a radial direction.

9. The motor according to claim 8, wherein
the opposite-to-output side bearing is formed in a bottomed cylindrical shape having a bearing recessed part, and
the end part on the opposite-to-output side of the rotation shaft is inserted into the bearing recessed part to abut with a bottom face of the bearing recessed part.

10. The motor according to claim 9, further comprising an end plate which is formed of a metal plate and which is fixed to the end face on the opposite-to-output side of the stator,
wherein the opposite-to-output side bearing is fixed to the stator by the end plate in the non-movable state.

11. The motor according to claim 8, wherein
the shaft support part is formed with a bearing hole which is formed by press blanking work punching from the output side face toward an opposite-to-output side face so as to penetrate through the shaft support part,
an output side bearing which supports the end part on the output side of the rotation shaft is disposed on the bearing hole movably in an axial direction of the rotation shaft,
and
the flat face part of the flat spring is welded and fixed to the output side face of the shaft support part so that the bearing abutting part of the flat spring urges the output side bearing to a side of the opposite-to-output side bearing.

12. The motor according to claim 11, wherein
the bearing abutting part of the flat spring is formed to protrude from the flat face part in an elongated shape and, in addition, the flat spring is formed with a slipping-out preventive part so as to protrude for preventing coming-off of the output side bearing from the bearing hole, and
the welded part is formed in a vicinity of the slipping-out preventive part.

* * * * *